Figure 1:
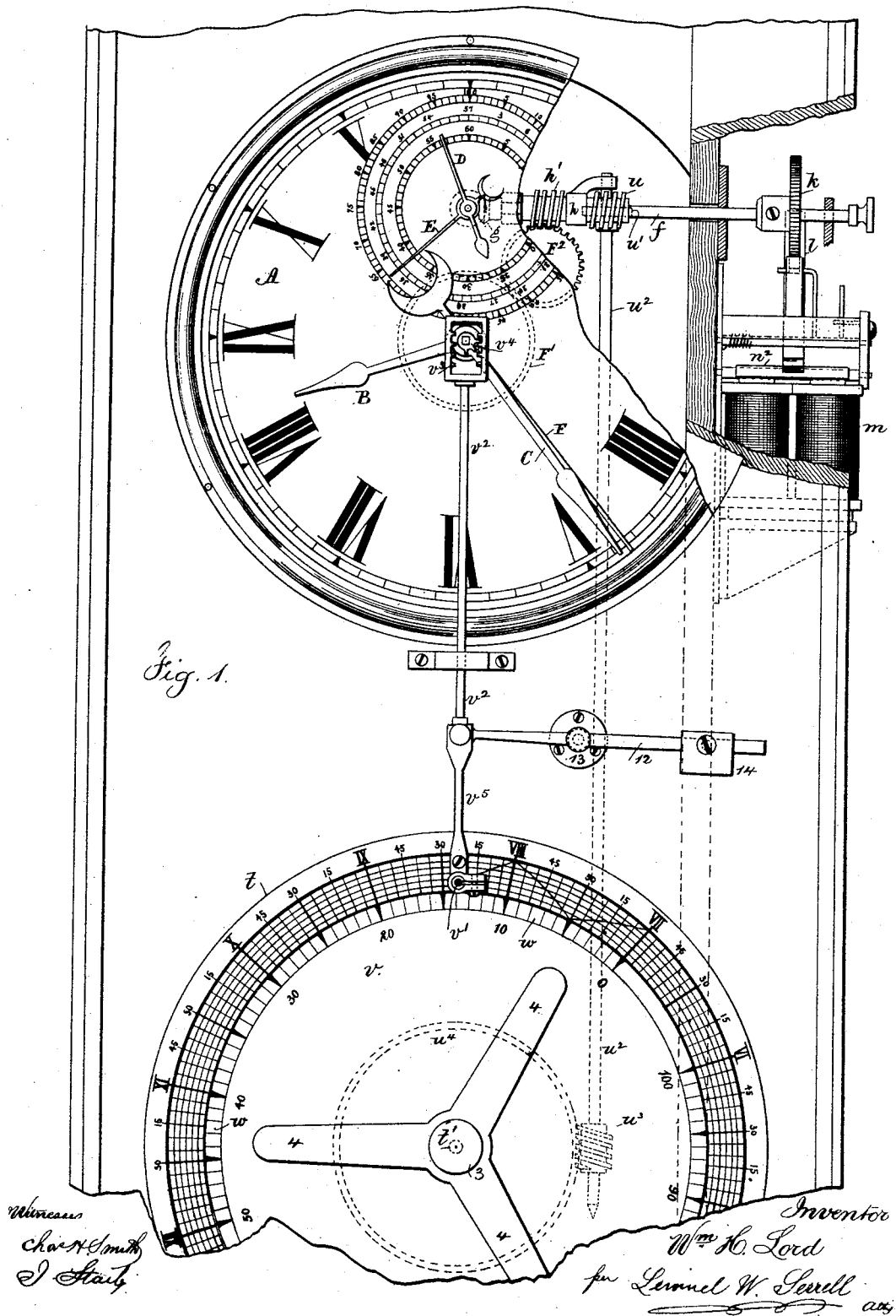

(No Model.) 2 Sheets—Sheet 1.

W. H. LORD.
SPEED CLOCK FOR MACHINERY.

No. 328,592. Patented Oct. 20, 1885.

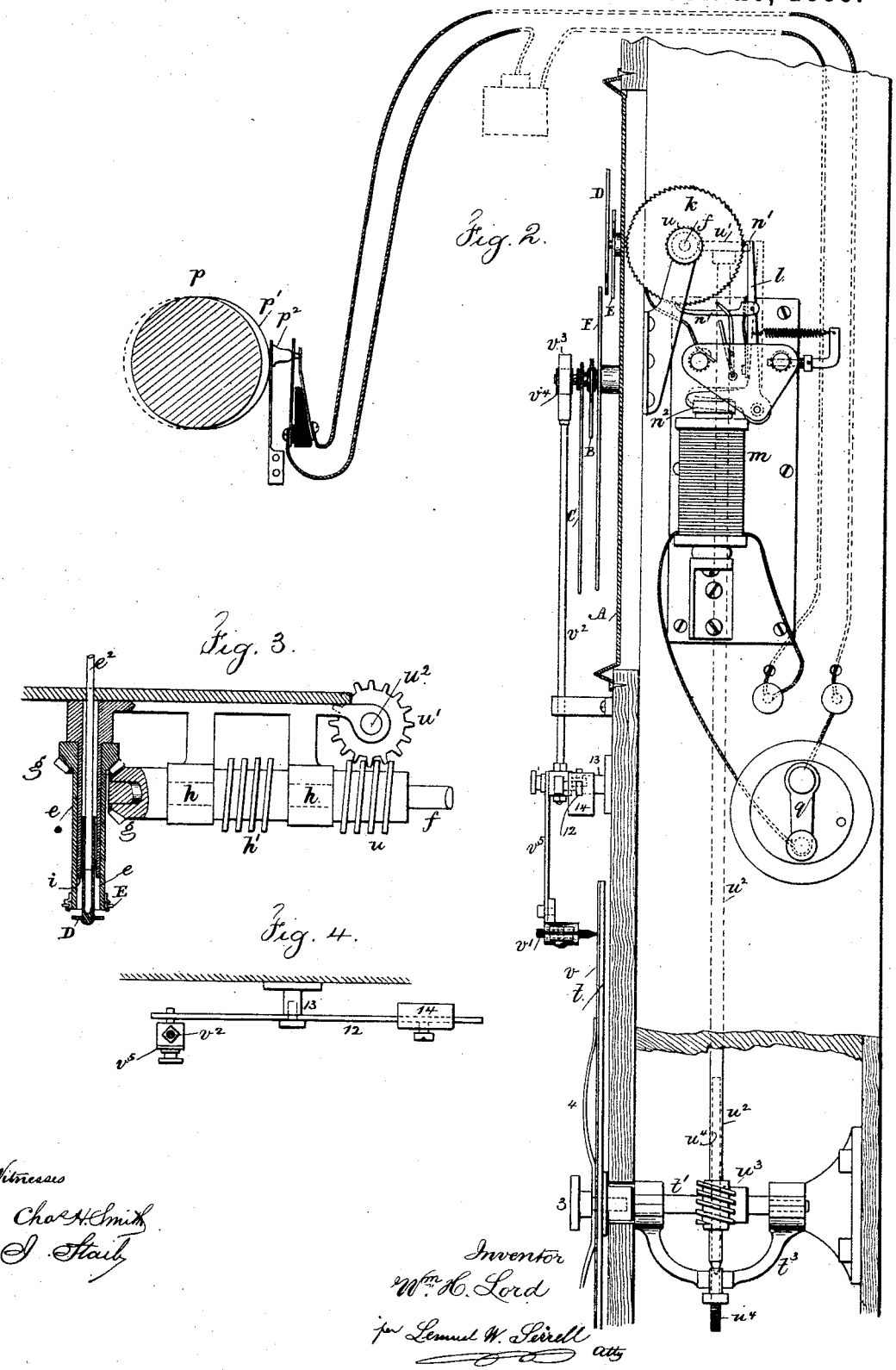

UNITED STATES PATENT OFFICE.

WILLIAM H. LORD, OF NEW YORK, N. Y.

SPEED-CLOCK FOR MACHINERY.

SPECIFICATION forming part of Letters Patent No. 328,592, dated October 20, 1885.

Application filed January 17, 1885. Serial No. 153,131. (No model.)

*To all whom it may concern:*

Be it known that I, WILLIAM H. LORD, of the city and State of New York, have invented an Improvement in Speed-Clocks for Machinery, of which the following is a specification.

In Letters Patent Nos. 298,487 and 300,491 clock mechanism is set forth having in view the indication upon the clock-dial of the relative speed of the steam-engine or other machinery; but such clock was most easily placed near to the engine or revolving shaft.

In most manufacturing establishments the office is at some distance from the engine, and it is important that the speed of the engine be indicated to owners or managers of the establishment, because if the speed lessens materially the production, especially in spinning and weaving, is proportionately lessened.

The present invention is intended for steamships at sea as well as land-engines. The apparatus can be placed in the captain's or chief engineer's room. It is valuable as an assistant in keeping a correct log hourly and daily.

In my present improvements I make use of a speed seconds-hand and a speed minute-hand, the speed-hands being of a different color from the ordinary hands, and the driving mechanism is arranged so that when the engine or shaft is revolving at the regular speed the speed-hands will move at the same rate and coincide with the time-hands; but where the speed-hands move either too fast or too slow the difference is at once noticeable by the hands not coinciding; and the speed parts are combined with an electro-magnet and circuit-closer, so that the clock can be placed at any desired distance from the motor, and the speed mechanism can be changed to adapt the same to different speeds of engines by changing one wheel, so as to have a greater or less number of teeth in the same. There is also a record made of the speed upon a paper dial, that is to be removed daily and another substituted, and the speed-hands can be easily set from time to time, as required; or the clock can be operated, like a stop-watch, to indicate the speed or number of revolutions of an engine or shaft in a given time.

In the drawings, Figure 1 is an elevation of the clock and speed dials and hands, with a portion of the case removed to show the electro-magnet. Fig. 2 is an elevation of the electro-magnet and the mechanism moved by it, the dial being represented in section, and there being also a diagram representing the motor-shaft and circuit-connections. Fig. 3 is a sectional plan of the parts at the center of the seconds-hand arbor in larger size, and Fig. 4 is a plan of the lever and balance-weight to the recording apparatus.

The clock-dial A is of ordinary character, except that preferably there is a circle around the seconds-dial, the same being divided into one hundred, so as to indicate variations in speed in hundredths or by percentage. The mechanism for moving the ordinary hour-hand, B, minute-hand C, and second-hand D is to be of any desired character—such as employed for time-pieces—and the hands are preferably the ordinary dark-blued steel. The speed-hands E F are of a different color, and to obtain a marked contrast are by preference red. The speed-hand E is upon a tubular arbor, $e$, around the outside of the second-hand arbor $e^2$, and preferably revolves upon a fixed tube, $i$, that projects from the clock-frame. The shaft $f$ is connected to the arbor $e$ by bevel-gears $g$, so that the two revolve in unison, and this shaft $f$ is supported in suitable bearings, $h$, and provided with a worm-pinion, $h'$, which gives motion to the gears $F^2$ $F'$ and the speed-hand F, which hand is upon the tubular arbor of the gear-wheel $F'$, that surrounds the arbors of the hour and minute hands. (See Fig. 1.) This wheel $F'$ should have sixty teeth, so that the hand F may be revolved once an hour, the shaft $f$ revolving every minute. The speed-hands E and F are preferably red, so as to show distinctly from the ordinary time-hands. Upon the shaft $f$ there is a ratchet-wheel, $k$, and $l$ is a lever with a spring-pawl, $n$, thereon for acting on the ratchet-wheel, and a tooth, $n'$, to stop the ratchet-wheel from being turned more than one tooth at a time, and $n^2$ is an armature connected with this lever $l$, and upon which the electro-magnet $m$ acts. At $p$ is represented a shaft the speed of which is to be indicated, and upon it is a projection, $p'$, that acts upon the circuit-closer $p^2$, and this circuit-closer is in an electric circuit that includes a battery, the helix of the magnet $m$, and the switch $q$.

When this speed-indicator is to be constantly used with one engine, the parts are constructed and applied in such a manner that the shaft $f$ and hand E revolve once each minute. To effect this it is preferable to provide the same number of ratchet-teeth on the wheel $k$ as there are revolutions per minute of the shaft $p$, so that the electric circuit being closed once each revolution will take in the one minute a number of teeth corresponding to the number of teeth around said wheel $k$; but in cases where the shaft that is to be indicated revolves slowly there may be a second circuit-closing cam upon such shaft, as shown by dotted lines. In all cases the number of teeth is to be determined according to the use to which the speed-indicating clock is to be put.

In cases where the clock is to be used as a speed-meter for different engines or machines it is preferable to employ a wheel, $k$, with one hundred teeth, and to introduce the switch $q$ in the circuit-connection, as shown in Fig. 2, so that when the circuit-closing device has been connected to the shaft that is revolving the red hand E can be turned around to $o$ on the dial and stopped, and the circuit can be closed by the switch to start said hand the moment the second-hand of the clock reaches $o$, and the speed-indicating hand can again be stopped by the switch at the end of one, two, or more minutes, and the speed of the revolving shaft is thereby indicated with absolute certainty.

Usually it is desired to make a record that can be kept, to indicate the running-speed of the engine during each day. With this object in view I provide a disk, $t$, upon a spindle, $t'$, provided with a central thumb-screw, 3, and radial spring-fingers 4, so that by removing the screw 3 and fingers a paper record-card, $v$, may be placed upon the disk $t$ and clamped to its surface by replacing the thumb-screw and radial spring-fingers. The shaft or spindle $t'$ is in suitable bearings on a frame, $t^3$, and it is revolved by a connection to the shaft $f$ by suitable gearing. I prefer and use a worm-pinion, $u$, on the shaft $f$, gearing into a wheel, $u'$, upon the vertical shaft $u^2$, and this has a second worm-pinion, $u^3$, gearing into the wheel $u^4$ upon the spindle $t'$. The gearing is so proportioned that the disk $t$ revolves preferably once in twelve hours, and the paper or register card $v$ is printed with concentric circles and divided up into twelve main divisions, corresponding to hours, and twelve intermediate divisions corresponding to each five minutes, the quarter, half, and three-quarter hours being indicated as shown. There is a pencil, $v'$, at the end of a spring-arm, $v^5$, and to this is affixed a slide-rod, $v^2$, with a frame, $v^3$, at the upper end having teeth upon the interior surfaces of its side pieces. There is an interrupted pinion, $v^4$, upon the end of the minute-hand arbor, that is placed so as to move the slide-rod and pencil upwardly during one half-hour and downwardly during the next half-hour.

It will now be apparent that the mark made by the pencil upon the card or recorder will be diagonal and intersect the successive places where the concentric and radial lines cross each other, provided the disk and record-card are moving at the same rate as the time-hands of the clock; but if the engine is running too slow the record-card will not keep pace with the clock-hands, and the marks by the pencil, while still being diagonal zigzag, will not coincide with the marks of time printed upon the record-card, and the difference will show how much the engine has gone slow, or if the hour-mark on the record passes the pencil before the time-hand reaches the hour it will show the extent that the engine is running too fast.

It is usual to run engines for ten hours—say from seven to twelve and from one to six o'clock. In order to indicate the percentage of increase or diminution of speed in one day, I provide one hundred divisions at $w$ on the record-card at the rate of ten for each hour of running time, 0 being at seven o'clock, 50 at twelve o'clock, and repeated at one o'clock, and 100 at six o'clock.

The lever 12, pivoted at 13, and provided with an adjustable weight, 14, is connected by a joint-link with the guide-rod $v^2$, so as to counterbalance the pencil and its connected parts and cause the movements of such parts to be regular.

A cam may be used upon the arbor of the minute-hand in place of the interrupted pinion, to give motion to the pencil, or a slotted cam with a pin in the slot may be used for the same purpose.

When the indicator is used with an engine that is set to run a given number of revolutions per minute, it is preferable to mark that number on the dial in addition to the seconds-divisions and the hundredths-divisions.

In the drawings the dial is shown as adapted to fifty-seven revolutions per minute.

I claim as my invention—

1. The combination, with the time hands and dial, of speed-indicating hands, mechanism for rotating such hands, an electro-magnet, armature, pawl-and-ratchet wheel, and circuit-connections to the distant circuit-closer and revolving shaft, substantially as set forth.

2. In a speed-indicator for machinery, the combination, with the revolving shaft, of an electric circuit, a circuit-closer, an electro-magnet, a ratchet-wheel, pawls, and armature, and a shaft and gearing, and a speed-hand and a time-hand both revolving over the same dial, substantially as set forth.

3. The combination, with the time hands and dials, of speed-hands and mechanism for revolving the speed-hands over the time-dials, and a disk adapted to receive and hold a movable record-card, mechanism for revolving the same in unison with the speed-hands, and a pencil or marker actuated by the time mechanism for indicating the relative speed and time movements, substantially as set forth.

4. The combination, with the time-hands, of an interrupted pinion, $v^4$, upon the arbor of the minute-hand, the slide-rod $v^2$, and internal rack-frame, the pencil, the disk, and speed-recording card having divisions thereon, as specified, and mechanism for revolving the disk from the engine or shaft, substantially as set forth.

5. The combination, with the speed and time hands, of a dial having divisions for the seconds, divisions indicating the percentage of speed, and divisions indicating the standard number of revolutions per minute, substantially as set forth.

Signed by me this 10th day of January, A. D. 1885.

WM. H. LORD.

Witnesses:
GEO. T. PINCKNEY,
WILLIAM G. MOTT.